(12) United States Patent
Oster

(10) Patent No.: US 8,829,880 B2
(45) Date of Patent: Sep. 9, 2014

(54) COMMUNICATION SYSTEM WITH MONITORED INPUT STATE OF AN INPUT DEVICE AS WELL AS CURRENT-INCREASING DEVICE

(75) Inventor: Viktor Oster, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 188 days.

(21) Appl. No.: 13/426,200

(22) Filed: Mar. 21, 2012

(65) Prior Publication Data
US 2012/0249109 A1  Oct. 4, 2012

(30) Foreign Application Priority Data
Mar. 25, 2011 (DE) .......................... 10 2011 015 220

(51) Int. Cl.
*G05F 5/00* (2006.01)
*H04Q 9/00* (2006.01)

(52) U.S. Cl.
CPC ............. *H04Q 9/00* (2013.01); *H04Q 2209/88* (2013.01)
USPC ........................................... 323/299

(58) Field of Classification Search
USPC ........................... 323/265, 266, 283–285, 299
See application file for complete search history.

(56) References Cited

U.S. PATENT DOCUMENTS

| | | | |
|---|---|---|---|
| 7,560,909 B2 * | 7/2009 | Coleman | 323/222 |
| 7,839,109 B2 * | 11/2010 | Carmen et al. | 318/466 |
| 8,558,712 B2 * | 10/2013 | Fechalos et al. | 340/664 |
| 2010/0052705 A1 | 3/2010 | Bonnet et al. | |

FOREIGN PATENT DOCUMENTS

DE  10118191 C1  11/2002

OTHER PUBLICATIONS

Dr. Loechel, "DE Application No. 10 2011 015 220.2 Office Action Nov. 18, 2011"Publisher: DPMA, Published in: DE.

* cited by examiner

*Primary Examiner* — Adolf Berhane
(74) *Attorney, Agent, or Firm* — Kaplan Breyer Schwarz & Ottesen, LLP

(57) ABSTRACT

The present invention concerns a communication system with monitored input state of an input device. The input device has an input connection, a ground connection and an input circuit connected between the input connection and the ground connection. The input circuit is designed to detect an input signal. A sensor device is also provided, which is connected to the input connection and optionally the ground connection. The communication system also has a current-increasing device connected to the input connection and the ground connection, which is designed to furnish an increased current for the input circuit for an adjustable time period as a function of the voltage lying on the input connection. A power supply is also provided to supply power to the sensor device.

11 Claims, 2 Drawing Sheets

Figure 1:
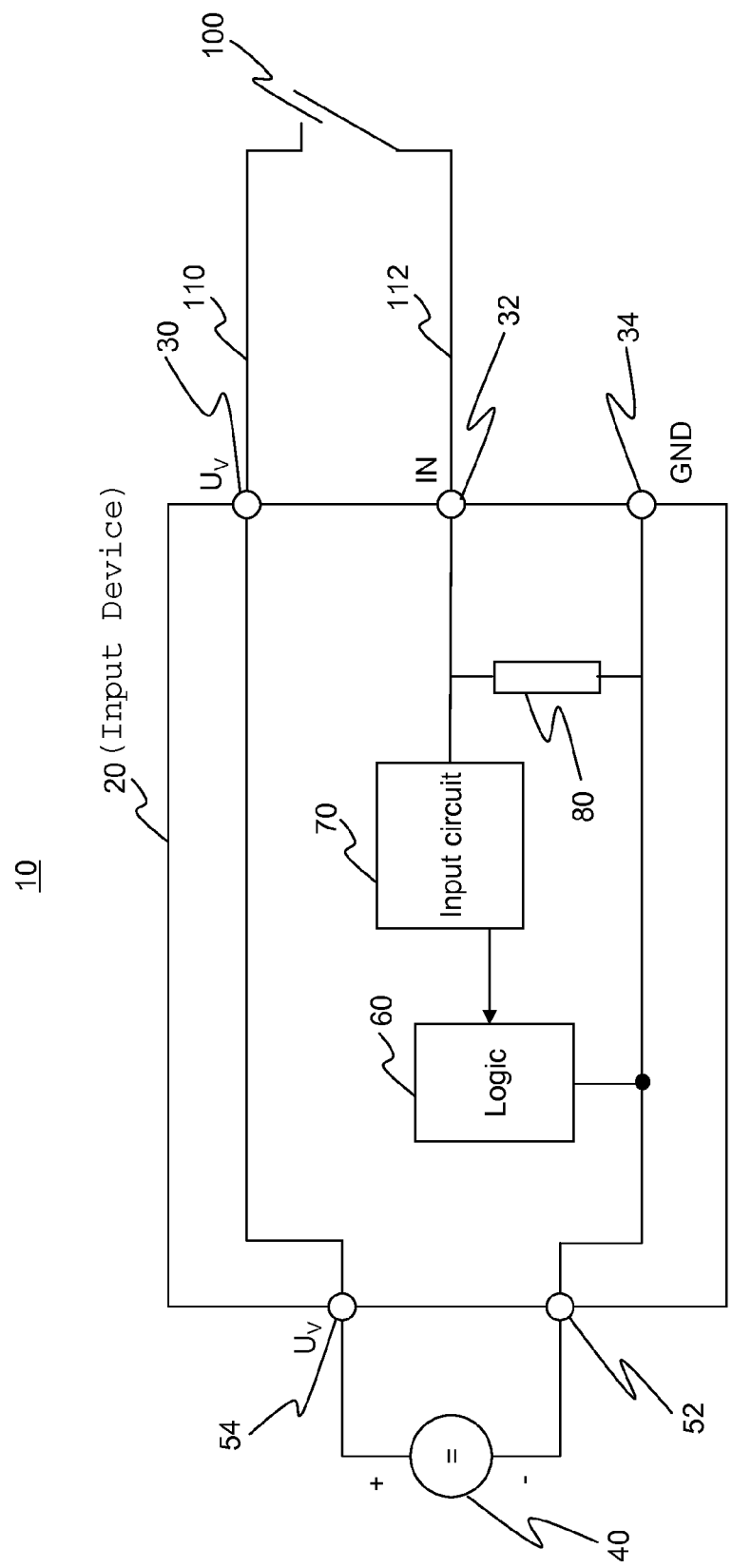

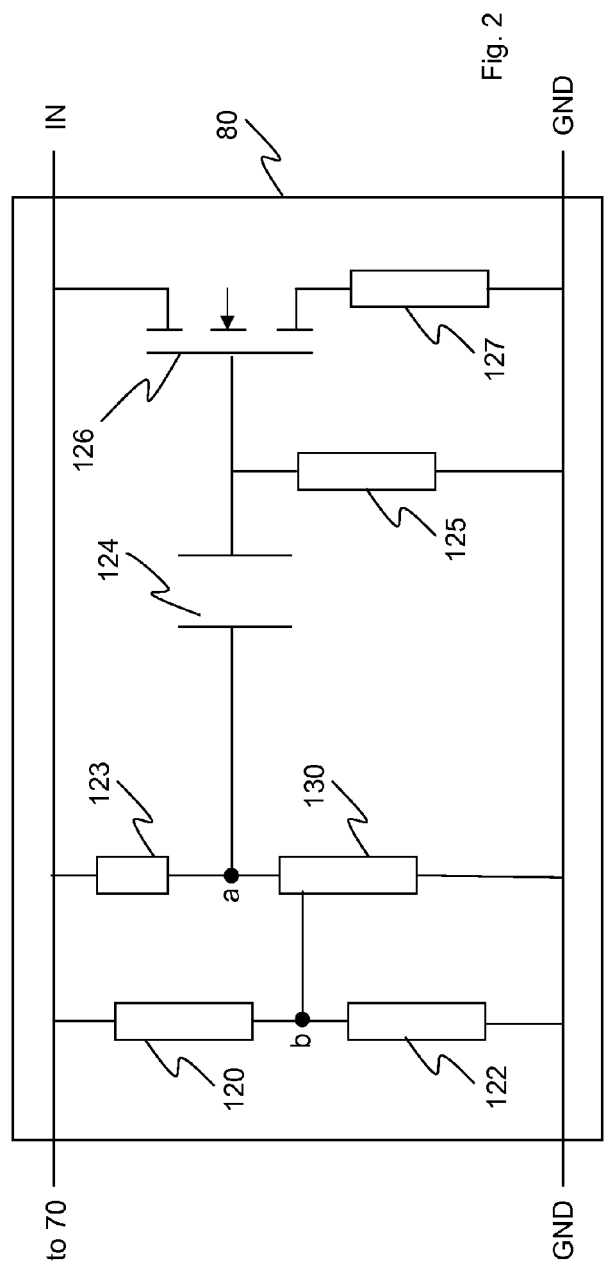
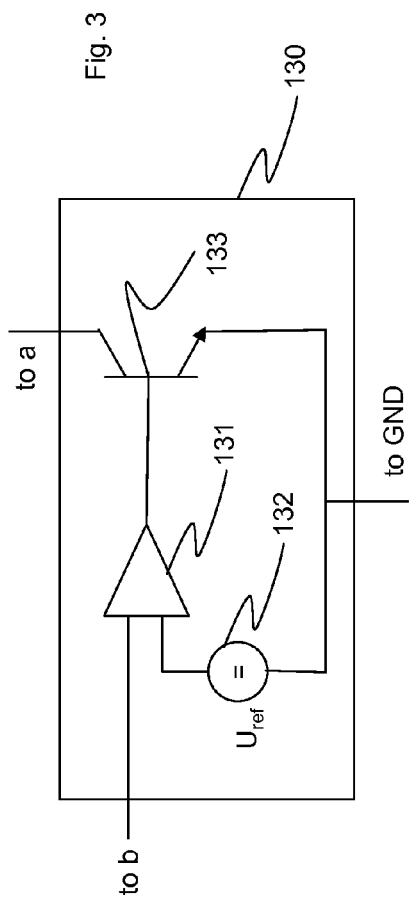
Fig. 2
Fig. 3

COMMUNICATION SYSTEM WITH MONITORED INPUT STATE OF AN INPUT DEVICE AS WELL AS CURRENT-INCREASING DEVICE

CROSS-REFERENCE TO RELATED APPLICATIONS

Patent application DE 10 2011 015 220.2, filed Mar. 25, 2011, is incorporated herein by reference.

DESCRIPTION

The invention concerns a communication system with an input device, whose input state is monitored, as well as a current-increasing device usable in such a communication system.

Miniaturization with respect to circuitry and equipment is also increasingly progressing in automation engineering. This means that measures must be taken to reduce power loss in the devices and circuits. This development in digital input devices has meant that the input current must be set increasingly lower. The input current in many applications even lies below 5 mA. Since the contacts of sensors connected to the digital input devices have infinite contact resistances, the input current can drop so far that it no longer can be reliably recognized by the input device. These drawbacks could be reduced by high-quality contacts, like gold-plated contacts; however, sensors with such contacts are expensive.

The underlying task of the invention is therefore to provide a communication system with monitored input state of an input device, as well as a current-increasing device, which permit reliable detection of contact-encumbered signals even in sensors with less high-quality contacts, which are therefore more cost-effective.

The aforementioned technical problem is solved by the features of Claim 1.

A communication system with monitored input state of an input device is proposed accordingly, which has an input device. The input device has an input connection, a ground connection and an input circuit connected between the input connection and ground connection. The input circuit is designed so that it can detect input signals delivered by a sensor. A sensor device is also proposed, which is connected to the input connection and, depending on the implementation, optionally to the ground connection. The communication system also has a power supply to supply the sensor device with power. The communication system also has a current-increasing device connected to the input connection and ground connection, designed to supply an increased current for the input circuit for an adjustable period, depending on the voltage lying on the input connection.

Thanks to this expedient it is possible to also reliably detect contact-encumbered input signals, if the input current is significantly reduced as a result of an increasing contact resistance of the sensor contact. Another advantage of this expedient according to the invention is that soiled contacts of the sensor device can be cleaned by a temporary increase in the input current and their contact resistance reduced again.

It should be mentioned here that the power supply is a separate voltage source, which supplies, for example, only the sensor device, a voltage source connectable to the input circuit or a voltage source arranged in the input device. The input device can have a power supply connection, to which the power supply can be connected.

The communication system can be an automation system or a stand-alone device. The input device can be designed as a digital input device and be a component of an input and output device. The input and output device can be designed as a control device, for example, as a memory-controllable control device. An emergency stop switch, a door protection switch and the like can be used as sensor device.

The current-increasing device in an advantageous embodiment of the communication systems can be designed to reduce the internal resistance of the input circuit for an adjustable period as a function of the voltage lying on the input connection.

It should be noted here that the adjustable period can be chosen short enough that the power loss can be kept low and overload of the communication system can be avoided.

The current-increasing device expediently has a detector device designed to detect the voltage between the input connection and the ground connection. At least one switching element connected to the detector device is also provided, which is designed to connect an electrical resistor with constant resistance between the input and ground connection, if the voltage between the input and ground connection has fallen below a threshold value.

The current-increasing device can be designed to switch the switching element on or off, depending on the detected input state of the input device.

In order to be able to perform a current increase optimally adapted to the input state, the current-increasing device has a detector device designed to detect the voltage between the input connection and the ground connection, a voltage-dependent resistance element connected to the detector device being provided, whose resistance value is variable as a function of the voltage lying on the input connection.

It should be noted here that the current-increasing device can also be designed as a power supply.

As an alternative, the input device can have a detector device designed to detect the voltage difference between the power supply connection and the input connection. In this case the current-increasing device is designed to reduce the internal resistance of the input circuit as a function of the detected voltage difference for an adjustable time period. The current-increasing device in this practical example can also be designed to reduce the internal resistance by a constant value or by a value variable as a function of the detected voltage difference.

The current-increasing device can be implemented in the input device in order to permit a compact design.

As an alternative, the current-increasing device can be designed as an externally connectable circuit device, which is implemented, for example, in a terminal or series terminal to which the input device can be connected.

The aforementioned technical problem is also solved with the features of Claim 10.

A current-increasing device is accordingly provided, which is designed for use in the communication system described above.

The invention is further explained below with reference to a practical example in conjunction with the appended drawings. In the drawings:

FIG. 1 shows a communication system with an input device and a current-increasing device according to the invention, FIG. 2 shows a typical circuit layout of the current-increasing device depicted in FIG. 1, FIG. 3 shows a typical circuit of the reference voltage circuit depicted in FIG. 2.

A typical communication system 10 is shown in FIG. 1, which contains an input device 20. The input device can be designed as a digital input device. It is noted that the input device 20 can be a component of an input and output device, a control device or also a field device, which can have both a digital input and a digital output. The communication system 10 can operate in stand-alone operation or be a component of an automation system.

The input device 20 can have a power supply connection $U_v$, which is marked by the reference number 30. A supply voltage $U_v$ lies on the power supply connection 30, which is supplied by a dc voltage source 40. The dc voltage source 40 can be an external dc voltage source, which is connected to the inputs 52 and 54 of the input device 20. The dc voltage source 40 delivers a supply voltage of, say, 25 volts. The input device 20 has a digital input with at least one digital input connection IN, which is marked with reference number 32.

The input device 20 depicted in FIG. 1 functions as an input device at whose power supply connection 30 and input connection 32 a load 100 is connected. The load 100 is a sensor, which is an emergency stop switch in the present example. It is also conceivable that the sensor 100 is connected directly to an external power supply, for example, power supply 40. In this case the input device 30 requires no power supply connection 30.

The input device 20 also has an input circuit 70, which is connected to the input connection 32. The function of such an input circuit is known per se. Ordinarily the input circuit 70 contains a threshold value detector, which recognizes whether a voltage lies on input connection 32, which is greater than, say, 11 volts, or whether a voltage that is less than, say, 5 volts lies on input connector 32. The input circuit 70 is connected to a logic device 60, which is again connected to the ground connection 34 of the input device 20. The logic device 60 has the task, among others, of assigning a logic value to the voltage level detected by the input circuit 70. For example, the logic value 1 is assigned to any voltage value greater than or equal to 11 volts, whereas the logic value 0 is assigned to all voltage levels less than 5 volts.

The input device 20 also has a current-increasing device 80, which is also connected between the input connection 32 and the ground connection 34. As shown in FIG. 1, the current-increasing device 80 can be implemented in the input device 20. As an alternative, it can be connected as a separate circuit externally to the input device 20. It is also conceivable that the current-increasing device 80 is implemented in a terminal or series terminal, to which the input device 20 can be connected.

It is already mentioned here that one task of the current-increasing device 80 is to increase the input current for the input circuit 70 deliberately for an adjustable time, so that the input circuit 70 can correctly detect the input signal. The method of function of the current-increasing device 80 is further explained subsequently.

FIG. 2 shows a typical circuit implementation of the current-increasing device 80 shown in FIG. 1. The current-increasing device 80 has a voltage detector device, which includes a voltage divider having two series-connected resistors 120 and 122. The resistors 120 and 122 of the voltage divider are connected to the input connection 32 and ground connection 34, in which one connection of resistor 120 is connected to the input connection 32 and one connection of resistor 122 is connected to ground connection 34. The other connections of resistors 120 and 122 form a common connection point b. A resistor 123 is connected to the input connection 32, which is connected to the output of a reference voltage circuit 130. The reference voltage circuit 130 can be assigned together with resistors 120 and 122 to the detector device. The reference voltage circuit 130 is also connected to the ground connection 34. The reference voltage circuit 130 also has an input, which is connected to the connection point b of the voltage divider. The output of the reference voltage circuit 130 forms a common connection point a with the connection of resistor 123, which is connected to the control connection of a switching element 126 via a capacitor 124. The switching element 126 can be a field effect transistor. The field effect transistor 126 is a self-blocking n-Mosfet. In this case the control connection is the gate connection of the field effect transistor. The gate connection of the field effect transistor 126 is preferably connected to ground connection 34 via a resistor 125. The source connection of field effect transistor 126 is connected to ground connection 34 via a resistor 127. The resistor 127 in the depicted example is a passive resistor with a constant resistance value. The drain connection of field effect transistor 126 is connected to the input connection 32 of the input and output device 20.

FIG. 3 shows a typical circuit implementation of the reference voltage circuit 130 depicted in FIG. 2. The reference voltage circuit 130 has a comparator 131, one input of which is connected to connection point b. The other input of comparator 131 is connected to a dc voltage source 132, which is also connected to ground connection 34. The dc voltage source 132 delivers a reference voltage $U_{ref}$, which amounts to, say, 15 volts. The output of comparator 131 is connected to the input of a switching element 133, which is designed in the present case as a bipolar npn-transistor. The output of comparator 131 is therefore connected to the base connection of transistor 133, whereas the collector of transistor 133 is connected to connection point a. The emitter connection of transistor 133 is connected to ground connection 34.

The method of function of communication system 10 is explained further with reference to FIGS. 1 to 3.

In the typical scenario described subsequently the input state of input device 20 is monitored by the input circuit 70, in order to detect a deterioration of the contact resistance of the contact of emergency stop switch 100.

Assume initially that the contact of sensor 100 is closed and operating perfectly. If the contact of sensor 100 is closed, the operating voltage $U_v$ also lies essentially on input connection 32 via the power supply connection 30 and emergency stop switch 100. The current-increasing device 80 in this state is deactivated, i.e. the field effect transistor 126 is opened and high-resistance. The voltage lying at connection point b of the voltage divider, which is proportional to the voltage on input connection 32, is greater in this case than the reference voltage $U_{ref}$ of the reference voltage circuit 130, i.e. greater then 15 V. The comparator 131 consequently controls the transistor 133 so that it becomes conducting and therefore pulls connection point a to ground GND. This behavior is achieved by appropriate dimensioning of the voltage divider. The capacitor 124 is discharged in this state, so that the field effect transistor 126 of current-increasing device 80 is opened.

The input circuit 70 therefore recognizes in the proper state of sensor 100 that the input voltage on input connection 32 is greater than the set threshold value of 11 volts, so that the logic device 60 reports a logic high-level.

Assume now that the contact resistance of the sensor contact is increased during operation, so that the voltage lying on input connection 32 drops accordingly. This voltage drop is continuously detected by resistors 120 and 122 of the voltage divider. If the voltage lying on connection point b, which also lies at the input of comparator 131, drops, as a result of a corresponding rise in contact resistance of the sensor contact, below the value of reference voltage $U_{ref}$ of the voltage source 132, the output of comparator 131 goes to zero, so that transistor 133 blocks; the reference voltage circuit 130 consequently become high-resistance. The connection point a between resistor 123 and the reference voltage circuit 130 is therefore pulled to the voltage lying on input connection 32 via the resistor 123. The field effect transistor 126 becomes conducting on this account, so that the resistor 127 is connected between input connection 32 and ground 34 and parallel to the internal resistance. Because of this the internal resistance acting with respect to input connection 32 and ground connection 34 is reduced. As a result, a higher input current flows into the input circuit 70, which can reliably recognize the closed switch state of sensor 100 despite deterioration of the contact resistance of the sensor contact. The value of resistance 127 can be adjusted to the connected sensor 100 in order to achieve a sufficient current increase.

The deliberate increase in input current by the current-increasing device 80 also has the advantage that the contact of sensor 100 is cleaned. As a result, the contact resistance of the sensor contact is reduced and the voltage on input connection 32 rises again. The input circuit 70 can be designed so that it recognizes a voltage rise on input connection 32. In response to the voltage rise the input circuit 70 and/or logic device 60 can deactivate current-increasing device 80, i.e. keep resistor 127 high-resistance, for example.

As an alternative or in addition, the deterioration of contact resistance of the sensor contact can also be detected monitoring the voltage difference between the power supply connection 30 and the input connection 32. The input circuit 70 or the current-increasing device 80 can be advantageously designed to monitor this voltage difference. For this purpose the voltage divider of the current-increasing device 80 could be connected between the power supply connection 30 and the input connection 32. If the input circuit 70 or the current-increasing device 80 recognizes that the voltage difference between the power supply connection 30 and the input connection 32 increases, this increase suggests a deterioration of the quality of the sensor contact and therefore a an increased voltage drop on the contact of sensor 100. If the monitored voltage difference exceeds an adjustable threshold value, the field effect transistor 126 becomes conducting and connects, for example, the ohmic resistance 127 between the input connection 32 and ground connection 34. This expedient again leads to a deliberate increase in input current. If the voltage difference is monitored by the input circuit 70, the field effect transistor 126 can be controlled, for example, by the logic device 60.

The resistors 123 and 125 together with capacitor 124 form a time element, whose dimensioning determines a time constant, which establishes how long the field effect transistor 126 is supposed to be conducting during a current-increasing process. The current-increasing device 80 can be protected from overload on this account, if, for example, a constant voltage that lies below the reference voltage $U_{ref}$ of voltage source 132, lies for a longer period on input connection 32 because of a defective sensor 100.

It is noted here that several reference voltage circuits can be connected between connection points b and a, which form a high-resistance or low-resistance output at different threshold values, i.e. reference voltages. It is conceivable in this context that each reference voltage circuit can control a differently dimensioned discharge resistor 127, so that the internal resistance acting on the input connection 32 and the ground connection 34 is discretely varied as a function of the set reference voltage source.

It is also conceivable that the electrical resistance furnished by the current-increasing device 80 during a current-increasing process between the input connection 32 and the ground connection 34 is not formed by the passive resistor 127, but by a voltage-controlled resistor. The internal resistance acting on the input connection 32 and on the ground connection 34 in this case can be continuously reduced as a function of the voltage lying on the input connector 32.

Thanks to the expedient that the current-increasing device 80 is only temporarily active, the power loss of communication system 10 can be reduced. Since the current-increasing device 80 also requires no signal coupling, but is connected directly into the feed line 110, 112 to sensor 100, errors, for example short circuits in the feed line 110, 112, can be recognized by the input circuit 70 without an adverse effect from the current-increasing device 80.

What is claimed is:

1. A communication system (10) for reliable detection of a contact-encumbered signal comprising:
   an input device (20), which has an input connection (32), a ground connection (34) and an input circuit (70) connected between the input connection (32) and ground connection (34), which is designed to detect a contact-encumbered signal delivered by a sensor device (100),
   the sensor device (100) connected to the input connection (32),
   a power supply (40) to supply the sensor device (100) with power, and
   a current-increasing device (80) connected to the input connection (32) and ground connection (34), which is designed to furnish an increased current for the input circuit (70) for an adjustable time period as a function of the voltage lying on the input connection (32), so that the contact-encumbered signal is reliably detectable.

2. The communication system according to claim 1 wherein the input circuit (70) has an internal resistance and that the current-increasing device (80) is designed to reduce the internal resistance of the input circuit (70) as a function of the voltage lying on the input connection (32) for an adjustable period.

3. The communication system according to claim 2 wherein the input device (20) has a power supply connection (30), to which the power supply (40) can be connected.

4. The communication system according to claim 1 wherein the current-increasing device (80) has: a detector device (120, 122, 130), which is designed to detect the voltage between the input connection (32) and the ground connection (34), at least one switching element (126) connected to the detector device (120, 122, 130), which is designed to connect an electrical resistance element (127) with constant resistance value between the input connection (32) and ground connection (34), if the voltage between the input connection (32) and ground connection (34) has fallen below a threshold value.

5. The communication system according to claim 4 wherein the current-increasing device (80) is designed to switch the switching element (126) on or off.

6. The communication system according to claim 1 wherein the current-increasing device (80) has:
   a detector device (120, 122, 130) designed to detect the voltage between the input connection (32) and the ground connection (34), and
   a voltage-dependent resistance element connected to the detector device (120, 122, 130), whose resistance value is variable as a function of the voltage lying on the input connection (32).

7. The communication system according to claim 3 wherein the input device (20) has a detector device designed to detect the voltage difference between the power supply connection (30) and the input connection (32) and that the current-increasing device (80) is designed to reduce the internal resistance of the input circuit (70) as a function of the detected voltage difference for an adjustable time period.

8. The communication system according to claim 7 wherein the current increasing device (80) is designed to reduce the internal resistance by a constant value or by a value variable as a function of the detected voltage difference.

9. The communication system according claim 1 wherein the current-increasing device (80) is implemented in the input device (20) or is designed as a connectable circuit device.

10. The communication system according to claim 1 wherein the input device (20) is a memory-programmable control device.

11. A current-increasing device (80), which is designed for use in the communication system of claim 1 and designed to furnish an increased current for the input circuit (70) for an adjustable time period as a function of the voltage lying on the input connection (32), so that the contact-encumbered signal delivered by the sensor device (100) is reliably detectable.

* * * * *